US012711005B2

(12) United States Patent
Rowlands et al.

(10) Patent No.: US 12,711,005 B2

(45) Date of Patent: Aug. 18, 2026

(54) HOST BUS ADAPTER MONITORING SYSTEM

(71) Applicant: Dell Products L.P., Round Rock, TX (US)

(72) Inventors: Scott Rowlands, Cumming, GA (US); Krishna Deepak Nuthakki, Bangalore (IN); Arieh Don, Newton, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/971,648

(22) Filed: Dec. 6, 2024

(65) Prior Publication Data

US 2026/0161493 A1 Jun. 11, 2026

(51) Int. Cl.

*G06F 11/00* (2006.01)
*G06F 3/06* (2006.01)
*G06F 11/07* (2006.01)
*G06F 11/10* (2006.01)

(52) U.S. Cl.

CPC ........ *G06F 11/0727* (2013.01); *G06F 3/0629* (2013.01); *G06F 3/067* (2013.01); *G06F 11/0709* (2013.01); *G06F 11/1024* (2013.01)

(58) Field of Classification Search

None

See application file for complete search history.

(56) References Cited

U.S. PATENT DOCUMENTS

2006/0136633 A1* 6/2006 Harima ................. G06F 3/0617 710/104
2007/0168571 A1* 7/2007 Ramsey .................... G06F 8/65 710/11
2014/0317441 A1* 10/2014 Arata ................. G06F 11/2028 714/4.12

OTHER PUBLICATIONS

Broadcom, "Retrieving FDMI Information from an HBA" (Year: 2022).*

* cited by examiner

*Primary Examiner* — Bryce P Bonzo
*Assistant Examiner* — Gabriella Kanani Shelton
(74) *Attorney, Agent, or Firm* — Krishnendu Gupta; Nikhil Patel

(57) ABSTRACT

One or more aspects of the present disclosure relate to detecting hardware and firmware misalignments in storage environments. A storage array receives fabric device management interface (FDMI) information from a switch containing configuration data for host bus adapters (HBAs) connected to multiple servers. The storage array analyzes connectivity patterns, manufacturer information, and firmware levels to identify potential misalignments against qualified configurations. The system detects irregular patterns such as inconsistent port connectivity across HBAs, mixed manufacturer deployments within servers, and firmware level variations. When misalignments are detected, the storage array initiates mitigation actions, allowing legitimate variations to be flagged to suppress future notifications. This automated monitoring helps storage administrators maintain consistent hardware and firmware configurations across server environments, reducing serviceability burden and management costs by proactively identifying potential issues before they impact performance or connectivity.

20 Claims, 5 Drawing Sheets

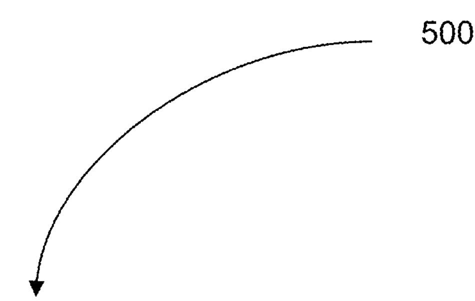

502 receiving fabric device management interface (FDMI) information from a switch, wherein the FDMI information includes hardware and firmware configuration data for a plurality of host bus adapters (HBAs) connected to a plurality of servers 504 analyzing, by the storage array, the FDMI information 506 detecting, based on the analysis, at least one hardware or firmware misalignment 508 initiating a mitigation action in response to detecting the at least one hardware or firmware misalignment

FIG. 5

HOST BUS ADAPTER MONITORING SYSTEM

BACKGROUND

Storage environments commonly utilize host bus adapters (HBAs) to enable communication between servers and storage arrays through fiber channel switches. In typical enterprise deployments, servers are equipped with multiple HBAs, with each HBA containing multiple ports for connectivity. These HBAs register their configuration details with the switch through fabric device management interface (FDMI), including manufacturer information, model numbers, serial numbers, firmware levels, operating system information, and physical deployment characteristics such as slot placement within the server. Storage array vendors maintain compatibility matrices that specify qualified HBA hardware manufacturers and corresponding firmware versions to ensure reliable operation with their storage systems.

SUMMARY

One or more aspects of the present disclosure relate to detecting hardware and firmware misalignments in storage environments. In embodiments, fabric device management interface (FDMI) information is received by a storage array from a switch. The FDMI information includes hardware and firmware configuration data for a plurality of host bus adapters (HBAs) connected to a plurality of servers. The FDMI information is analyzed to determine connectivity patterns between the servers and the storage array, identify manufacturer and firmware information for the HBAs, and compare the identified information against qualified configurations. Based on the analysis, the at least one hardware or firmware misalignment is detected. Further, a mitigation action is initiated in response to detecting the at least one hardware or firmware misalignment.

In embodiments, whether any server has only a single communication path to the storage array can be determined.

In embodiments, whether HBA port connectivity patterns are consistent across the plurality of servers can be determined by comparing numbers of connected ports per HBA.

In embodiments, whether all HBAs within a single server are from the same manufacturer can be determined.

In embodiments, firmware levels between multiple HBAs within a single server can be compared.

In embodiments, firmware levels of similar HBAs across different servers connected to the storage array can be compared.

In embodiments, whether identified HBA manufacturers are qualified for use with the storage array can be verified based on an approved hardware/firmware matrix.

In embodiments, an indication to flag a detected misalignment as legitimate can be received.

In embodiments, future notifications for the flagged misalignment can be suppressed.

In embodiments, the switch can be periodically queried to obtain updated FDMI information.

Other technical features may be readily apparent to one skilled in the art from the following figures, descriptions, and claims.

BRIEF DESCRIPTION OF THE DRAWINGS

The preceding and other objects, features, and advantages will be apparent from the following more particular description of the embodiments, as illustrated in the accompanying drawings. Like reference, characters refer to the same parts throughout the different views. The drawings are not necessarily to scale, emphasis instead being placed upon illustrating the embodiments'principles.

FIG. 5 is a flow diagram of a method for detecting hardware and firmware misalignments in storage environments per embodiments of the present disclosure.

DETAILED DESCRIPTION

In enterprise storage environments, servers typically deploy multiple host bus adapters (HBAs) with multiple ports to establish connectivity with storage arrays through fiber channel switches. These HBAs register detailed configuration information with the switch through fabric device management interface (FDMI), including manufacturer details, model numbers, firmware levels, operating system information, and physical deployment characteristics.

Organizations managing numerous servers traditionally aim to minimize hardware and firmware variations to reduce serviceability complexity. This approach leads to standardization efforts where administrators deploy servers from the same manufacturer, utilizing consistent firmware levels and HBA configurations. Storage array vendors maintain qualification matrices specifying approved HBA manufacturers and firmware versions for their systems.

However, storage administrators often need more visibility into server hardware and firmware configurations despite being responsible for investigating connectivity and performance issues. When problems arise, storage administrators cannot verify whether connected hosts maintain consistent and qualified configurations.

Embodiments of the present disclosure address these challenges by leveraging FDMI information to detect hardware and firmware misalignments. The storage array periodically queries the switch for FDMI data and performs multiple levels of analysis. This includes checking for single-path configurations, verifying consistent connectivity patterns across servers, ensuring HBA manufacturer uniformity, and monitoring firmware level consistency within individual servers and across the server fleet.

When irregularities are detected, such as inconsistent port connectivity or mixed manufacturer deployments, the storage array notifies the storage administrator. The system allows administrators to flag legitimate variations to suppress future notifications while maintaining the visibility of actual misconfigurations. This automated monitoring helps maintain consistent hardware and firmware configurations across server environments, reducing management overhead and enabling proactive identification of potential issues before they impact performance or connectivity.

The methodology particularly benefits environments with multiple server manufacturers, where traditional server management tools like Open Manage Enterprise (OME) may have limited effectiveness across different platforms. By providing storage administrators with comprehensive visibility into host configurations and automated misalignment detection, the system bridges the traditional gap between storage and server administration domains.

Figure 1:
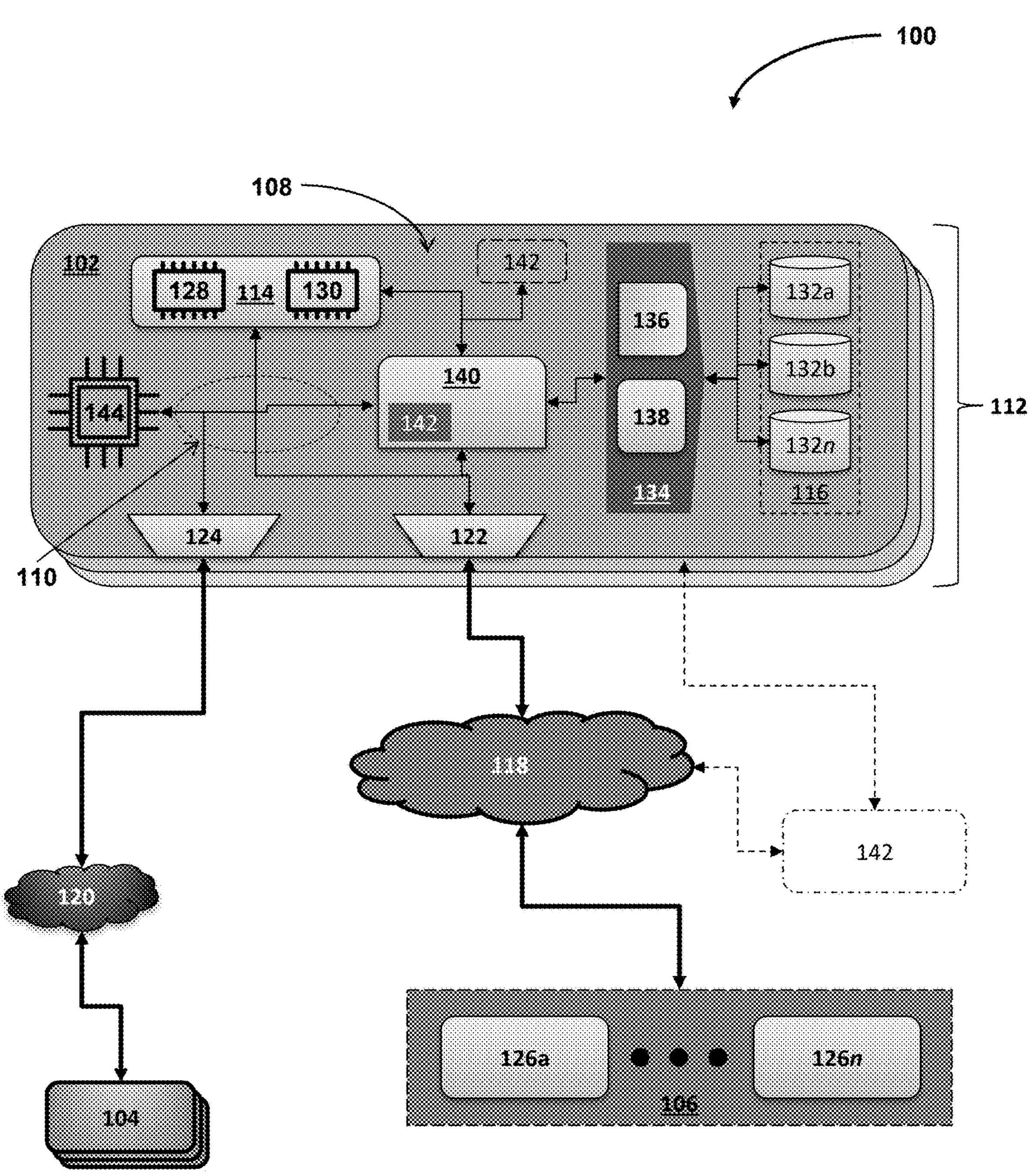
FIG. 1 illustrates a distributed network environment in accordance with embodiments of the present disclosure.

Regarding FIG. 1, a distributed network environment 100 can include a storage array 102, a remote system 104, and hosts 106. In embodiments, the storage array 102 can include components 108 that perform one or more distributed file storage services. In addition, the storage array 102 can include one or more internal communication channels 110 like Fibre channels, busses, and communication modules that communicatively couple the components 108. Further, the distributed network environment 100 can define an array cluster 112, including the storage array 102 and one or more other storage arrays.

In embodiments, the storage array 102, components 108, and remote system 104 can include a variety of proprietary or commercially available single or multi-processor systems (e.g., parallel processor systems). Single or multi-processor systems can include central processing units (CPUs), graphical processing units (GPUs), and others. Additionally, the storage array 102, remote system 104, and hosts 106 can virtualize one or more of their respective physical computing resources (e.g., processors (not shown), memory 114, and persistent storage 116).

In embodiments, the storage array 102 and, e.g., one or more hosts 106 (e.g., networked devices) can establish a network 118. Similarly, the storage array 102 and a remote system 104 can establish a remote network 120. Further, the network 118 or the remote network 120 can have a network architecture that enables networked devices to send/receive electronic communications using a communications protocol. For example, the network architecture can define a storage area network (SAN), local area network (LAN), wide area network (WAN) (e.g., the Internet), an Explicit Congestion Notification (ECN), Enabled Ethernet network, and the like. Additionally, the communications protocol can include a Remote Direct Memory Access (RDMA), TCP, IP, TCP/IP protocol, SCSI, Fibre Channel, Remote Direct Memory Access (RDMA) over Converged Ethernet (ROCE) protocol, Internet Small Computer Systems Interface (ISCSI) protocol, NVMe-over-fabrics protocol (e.g., NVMe-over-ROCEv2 and NVMe-over-TCP), and the like.

Further, the storage array 102 can connect to the network 118 or remote network 120 using one or more network interfaces. The network interface can include a wired/wireless connection interface, bus, data link, and the like. For example, a host adapter (HA 122), e.g., a Fibre Channel Adapter (FA) and the like, can connect the storage array 102 to the network 118 (e.g., SAN). Further, the HA 122 can receive and direct IOs to one or more of the storage array's components 108, as described in greater detail herein.

Likewise, a remote adapter (RA 124) can connect the storage array 102 to the remote network 120. Further, the network 118 and remote network 120 can include communication mediums and nodes that link the networked devices. For example, communication mediums can include cables, telephone lines, radio waves, satellites, infrared light beams, etc. The communication nodes can also include switching equipment, phone lines, repeaters, multiplexers, and satellites. Further, the network 118 or remote network 120 can include a network bridge that enables cross-network communications between, e.g., the network 118 and remote network 120.

In embodiments, hosts 106 connected to the network 118 can include client machines 126*a-n*, running one or more applications. The applications can require one or more of the storage array's services. Accordingly, each application can send one or more input/output (IO) messages (e.g., a read/write request or other storage service-related request) to the storage array 102 over the network 118. Further, the IO messages can include metadata defining performance requirements according to a service level agreement (SLA) between hosts 106 and the storage array provider.

In embodiments, the storage array 102 can include a memory 114, such as volatile or nonvolatile memory. Further, volatile and nonvolatile memory can include random access memory (RAM), dynamic RAM (DRAM), static RAM (SRAM), and the like. Moreover, each memory type can have distinct performance characteristics (e.g., speed corresponding to reading/writing data). For instance, the types of memory can include register, shared, constant, user-defined, and the like. Furthermore, in embodiments, the memory 114 can include global memory (GM 128) that can cache IO messages and their respective data payloads. Additionally, the memory 114 can include local memory (LM 130) that stores instructions that the storage array's processors 144 can execute to perform one or more storage-related services. For example, the storage array 102 can have a multi-processor architecture that includes one or more CPUs (central processing units) and GPUs (graphical processing units).

In addition, the storage array 102 can deliver its distributed storage services using persistent storage 116. For example, the persistent storage 116 can include multiple thin-data devices (TDATs) such as persistent storage drives 132*a-n*. Further, each TDAT can have distinct performance capabilities (e.g., read/write speeds) like hard disk drives (HDDs) and solid-state drives (SSDs).

Further, the HA 122 can direct one or more IOs to an array component 108 based on their respective request types and metadata. In embodiments, the storage array 102 can include a device interface (DI 134) that manages access to the array's persistent storage 116. For example, the DI 134 can include a disk adapter (DA 136) (e.g., storage device controller), flash drive interface 138, and the like that control access to the array's persistent storage 116 (e.g., storage devices 132*a-n*).

Likewise, the storage array 102 can include an Enginuity Data Services processor (EDS 140) that can manage access to the array's memory 114. Further, the EDS 140 can perform one or more memory and storage self-optimizing operations (e.g., one or more machine learning techniques) that enable fast data access. Specifically, the operations can implement techniques that deliver performance, resource availability, data integrity services, and the like based on the SLA and the performance characteristics (e.g., read/write times) of the array's memory 114 and persistent storage 116. For example, the EDS 140 can deliver hosts 106 (e.g., client machines 126*a-n*) remote/distributed storage services by virtualizing the storage array's memory/storage resources (memory 114 and persistent storage 116, respectively).

In embodiments, the storage array 102 can also include a controller 142 (e.g., management system controller) that can reside externally from or within the storage array 102 and one or more of its components 108. When external from the storage array 102, the controller 142 can communicate with the storage array 102 using any known communication connections. For example, the communications connections can include a serial port, parallel port, network interface card (e.g., Ethernet), etc. Further, the controller 142 can include logic/circuitry that performs one or more storage-related services. For example, the controller 142 can have an architecture designed to manage the storage array's computing, processing, storage, and memory resources as described in greater detail herein.

Figure 2:
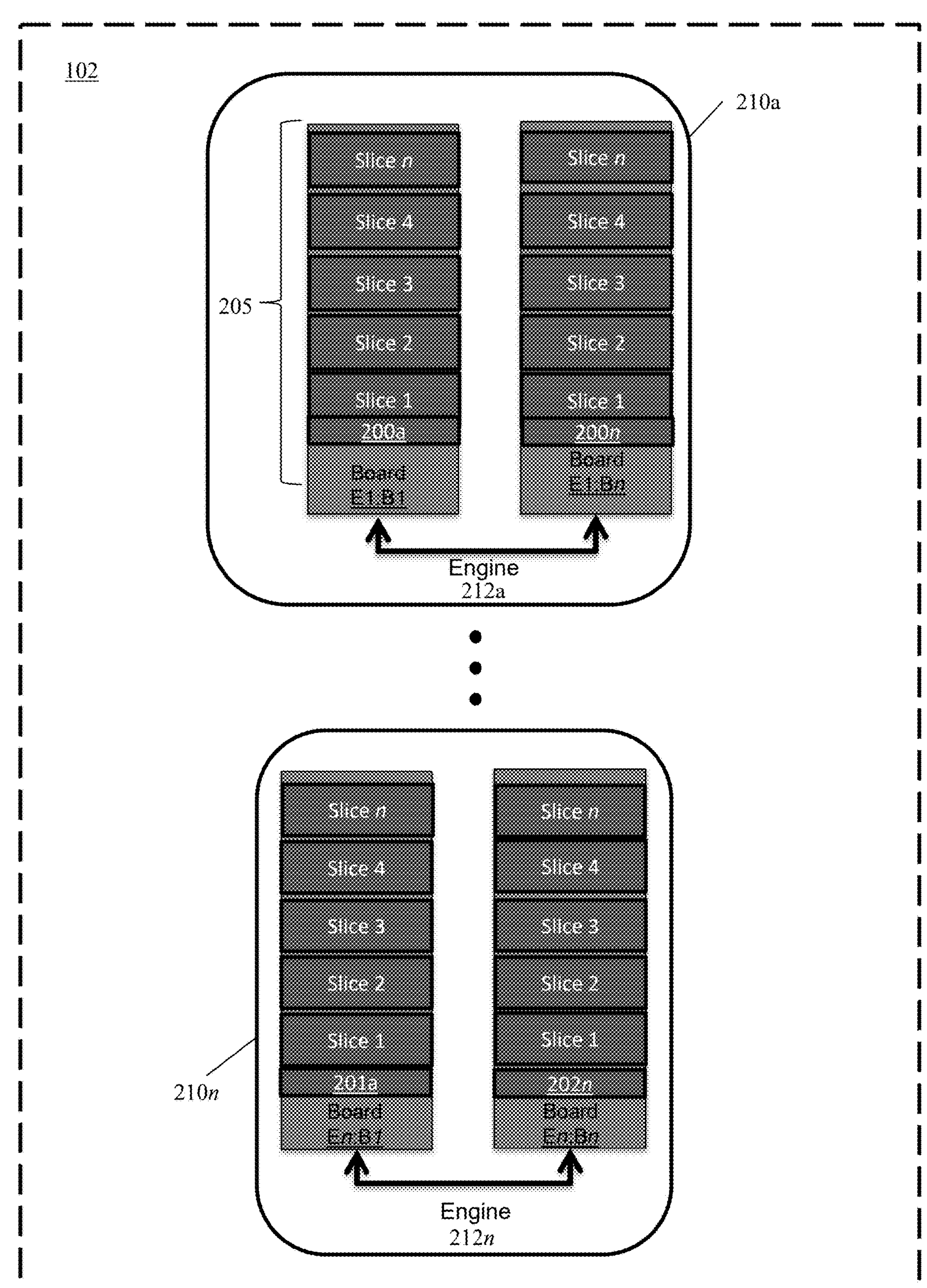
FIG. 2 is a block diagram of engines of a storage array, including director boards, in accordance with embodiments of the present disclosure.

Regarding FIG. 2, the storage array 102 includes engines 212*a-n* that deliver storage services. Each engine 212*a-n* has hardware circuity or software components required to perform the storage services. Additionally, the array 102 can house each engine 212*a-n* in one or more of its shelves (e.g., housing) 210*a-n* that interface with the array's cabinet or rack (not shown).

In embodiments, each engine 212*a-n* can include director boards (boards) E1:B1-E1:Bn, En:B1-En:Bn. The boards E1:B1-E1:Bn, En:B1-En:Bn can have slices 205, each comprising hardware or software elements that perform specific storage services. Each board's slices 1-n can correspond to or emulate one or more of the storage array's components 108 described in FIG. 1. For example, each board's Slice 1 can correspond to or emulate the EDS 140 or controller 142 of FIG. 1. In embodiments, the slices 2-n can emulate one or more of the array's other components 101. Further, the boards B1-*n* can include memory 200*a-n*-201*a-n*, respectively. The memory 200*a-n*-201*a-n* can be dynamic random-access memory (DRAM).

In embodiments, each emulated EDS 140 (collectively "EDS 140") can provision its respective board with memory from the array's global memory 128. For example, the EDS 140 can uniformly carve out at least one global memory section into x-sized memory portions 200*a-n*-201*a-n*. Further, the EDS 140 can size each global memory section or the x-sized memory portions 200*a-n*-201*a-n* to store data structure filters like cuckoo filters. The EDS 140 can size each global memory section or the x-sized portions based on an IO workload's predicted metrics related to the amount and frequency of sequential IO write patterns. For instance, the predicted metrics can define the amount of data the x-sized memory portions 200*a-n*-201*a-n* can be required to store.

Figure 3:
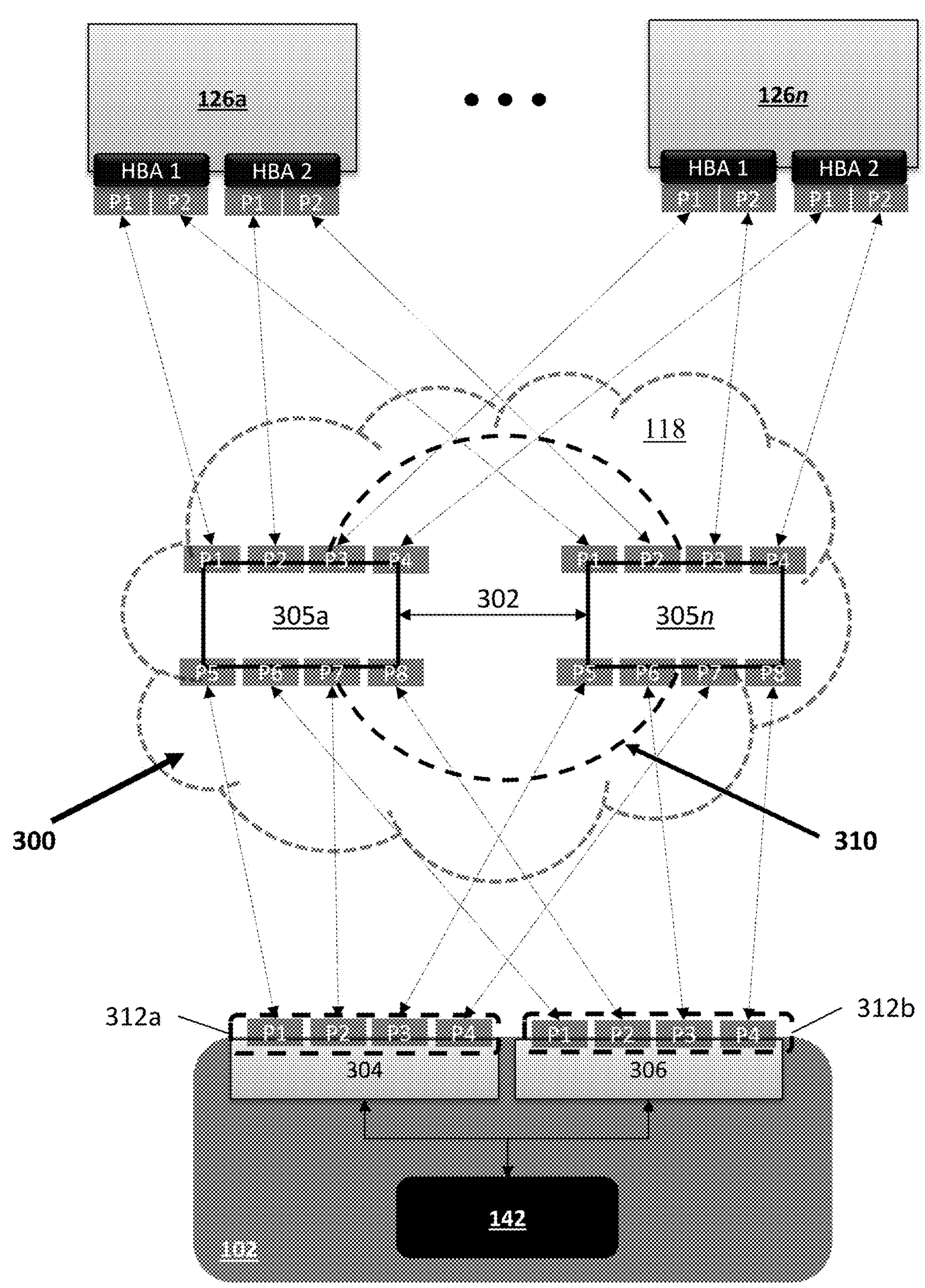
FIG. 3 is a block diagram of a communications network in accordance with embodiments of the present disclosure.

Regarding FIG. 3, a network (e.g., a storage area network) 118 can include one or more interconnected nodes (e.g., switches) 305*a-n* that define a structure and flow of information between devices on the network 118. In embodiments, the network can interconnect the nodes 305*a-n* using links 310. The links 310 can allow the nodes 305*a-n* to exchange messages using one or more communication protocols. The communications protocols can define a method (e.g., rules, syntax, semantics, and the like) by which the nodes 305*a-n* can pass messages and signals to other networked devices. Further, the protocol can define a communications synchronization process and error recovery methods. The network 118 can implement the protocol using hardware, software, or a combination of both. The protocol's rules, syntax, and semantics can include, e.g., a circuit switching, message switching, or packet switching technique. In embodiments, the nodes 305*a-n* can comprise networking hardware such as computing nodes (e.g., computers), servers, networking hardware, bridges, switches, hubs, and the like.

For example, the nodes 305*a-n* can correspond to Fibre Channel (FC) switches connected via an inter-switch link (ISL) 302. The ISL 302 allows communication and data transfer between switches, creating larger fabric topologies and providing redundancy. ISLs are typically high-speed links that carry traffic between switches, allowing devices connected to different switches to communicate with each other as if they were on the same switch. In the context of SAN FC Zoning, ISLs are crucial in connecting multiple switches to form a larger, more flexible network infrastructure.

The network 118 can arrange the nodes 305*a-n* to define one or more of a Chain Network (CHN), Y-Network (YN), Wheel Network (WN), Circle Network (CIRN), All-Channel Network (ACN) such as a Star Network, and the like. In a CHN, the nodes 305*a-n* have a hierarchical relationship (e.g., topology) that requires communications to flow through a formal chain. In a YN, the nodes 305*a-n* have a topology resembling an upside-down 'Y' (e.g., information flows upward and downward through the hierarchy). In a WN, data flows to and from a networked device (e.g., array 102). In a CIRN, the nodes 305*a-n* have a topology that restricts the flow of information to/from one node of the nodes to an adjacent node (e.g., a neighboring node). In embodiments, each node can have at most two adjacent nodes. In an ACN, the nodes 305*a-n* have a structure that allows communications to flow upward, downward, and laterally among each node. As illustrated, the network 118 can have an arrangement 300 consistent with an ACN. In embodiments, the network 118 can define one or more communication paths between the array 102 and hosts 1226*a-n*.

In embodiments, hosts 126*a-n* can connect to the network (e.g., SAN) 119 using Host Bus Adapters (HBAs) (e.g., respective HBAs 1-2) that are substantially similar to Network Interface Cards (NICs) in Ethernet networks. Each HBA (respective HBAs 1-2) includes ports P1-2 that are assigned unique World Wide Names (WWNs). The HBA ports P1-2 can connect to switch ports (e.g., ports P1-4 of switches 305*a-n*) via Fibre Channel links.

In embodiments, FC switches (e.g., switches 305*a-n*) can include multiple ports P1-8, each with its own WWN. The switches 305*a-n* can include switch host ports P1-4 connected to hosts. The switches 305*a-n* can also include switch storage ports P5-8 connected to one or more storage arrays (e.g., the storage array 102). Further, the switches 305*a-n* can be interconnected using Inter-Switch Links (ISLs) for redundancy and expanded connectivity.

In embodiments, a storage array 102 can include director boards 304/306 (e.g., substantially like director boards En:Bn of FIG. 2), each including a small input/output (IO) card (SLIC) 312*a-b*. Each SLIC can include multiple FC ports (e.g., ports P1-4) connected to corresponding switch storage ports P5-8 of respective switches 305*a-n*. Like other components (e.g., ports) of the network 118, the FC ports P1-4 on each SLIC 312*a-b* are assigned World Wide Names (WWNs). The SLICs 312*a-b* provide an interface between the storage array 102 and the external fabric corresponding to the network 118. Accordingly, the SLICs 312*a-b* allow the storage array 102 to connect to multiple FC switches (e.g., the FC switches 305*a-n*).

In embodiments, WWNs are unique identifiers in Fibre Channel networks, similar to IP addresses in Ethernet networks. Each device (e.g., HBA port, switch port, storage array port) is assigned a unique WWN. The WWNs can identify each device and port in the SAN 118. Additionally, the WWNs can be used to create logical zones that define which devices can communicate with each other. Specifically, zoning techniques use WWNs to create logical groups of devices that are allowed to communicate. Further, networked devices (e.g., the hosts 126*a-n*, FC switches 305*a-n*, and storage array 102) on the SAN 118 can implement multipathing techniques that use the WWNs to identify and manage multiple paths between the networked devices. Using WWNs, SAN administrators can precisely control and manage connectivity, security, and resource allocation in the Fibre Channel network, ensuring that only authorized devices can communicate and access specific resources.

In embodiments, the storage array 102 can include a controller 142 that memory and at least one processor configured to perform hardware and firmware misalignment detection and reporting in a storage environment. The controller 142 is configured to periodically query switches 305*a-n* to obtain Fabric Device Management Interface (FDMI) information about connected host bus adapters (HBAs) (e.g., HBA 1-2 of hosts 126*a-n*).

The FDMI information received by the controller 142 can include detailed configuration data for each HBA, such as manufacturer details, model numbers, serial numbers, firmware levels, operating system information (e.g., Windows, ESXi, Linux, AIX levels), HBA slot placement in the server/host 126*a-n*, and other relevant configuration parameters.

Using the received FDMI information, the controller 142 can perform a comprehensive analysis to determine connectivity patterns between servers/hosts 126*a-n* and the storage array 102, identify manufacturer and firmware information for all connected HBAs (e.g., HBA 1-2 of hosts 126*a-n*), and compare the identified information against qualified configurations stored in memory.

In embodiments, connectivity patterns can correspond to how HBA ports (e.g., HBA 1-2 of hosts 126*a-n*) are connected and communicate with the storage array 102. A connectivity pattern can involve servers/hosts 126*a-n* having multiple HBAs with an equal distribution of connected ports. For example, a server with two HBAs would normally have two ports from each HBA connected to the storage array for balanced connectivity.

The controller 142 can identify irregular connectivity patterns, such as when a server/host 126*a-n* has four HBAs where three HBAs have two ports connected. Still, the fourth HBA has only one port connected. While such configurations can be technically valid, they deviate from typical connectivity patterns and warrant investigation.

The controller 142 can also examine path redundancy as part of connectivity pattern analysis. This includes detecting servers/hosts 126*an* with only a single communication path to the storage array 102, which could indicate a potential single point of failure.

The controller 142 can leverage both masking information available to the storage array 102 and the FDMI data to correlate HBA World Wide Names (WWNs) with specific servers/hosts 126*a-n* and HBAs (e.g., HBA 1-2 of hosts 126*a-n*). This information allows the controller 142 to track which WWNs belong to which servers and correlate them with specific HBAs. Through this correlation, the controller 142 can detect various types of misalignments, including servers/hosts 126*a-n* with only a single communication path to the storage array 102, irregular HBA port connectivity patterns such as when a server/host 126*a-n* has inconsistent numbers of connected ports across its HBAs, HBAs from different manufacturers within the same server, and firmware level variations between HBAs within individual servers and across different connected servers.

Using the masking information and FDMI data, the controller 142 can determine the expected number of paths between each server/host 126*a-n* and the storage array 102. For instance, if the masking information indicates four WWNs should be communicating with a device (two from each HBA), but only three paths are actively connected, the controller 142 can identify this as an irregular connectivity pattern.

In embodiments, the masking information maintained by the storage array 102 contains details about which HBA World Wide Names (WWNs) are authorized to communicate with the storage array. This information allows the controller to track which WWNs belong to which servers and correlate them with specific HBAs.

The masking information works with the FDMI data, enabling the controller 142 to determine the complete connectivity topology. For example, the masking information can indicate that four WWNs are configured to communicate with a particular device. In contrast, the FDMI information reveals that these WWNs belong to two different HBAs within the same host-two WWNs from one HBA and two from another.

By combining the masking information with FDMI data, the controller 142 can detect irregular connectivity patterns, such as when the expected number of paths defined in the masking information does not match the actual logged-in paths. For instance, if the masking information specifies four WWNs should be communicating with a device, but only three have logged in, the controller 142 can determine that a path is missing.

The masking information also helps establish the expected connectivity patterns that should exist between servers/hosts 126*a-n* and the storage array 102. When these patterns deviate from the norm, such as having three ports connected from one HBA and only two from another when equal distribution would be expected, the controller 142 can identify these irregularities through comparison with the masking configuration.

The controller 142 maintains in memory an approved hardware/firmware matrix defining qualified HBA manufacturers and firmware versions for use with the storage array. When analyzing the FDMI information, the controller 142 compares detected configurations against this matrix to identify non-qualified hardware or firmware combinations.

Upon detecting misalignments through its analysis, the controller 142 can initiate appropriate mitigation actions, such as generating notifications for a storage administrator. Additionally, the controller can suppress future notifications for specific misalignments that administrators have reviewed and flagged as legitimate in the system.

Figure 4:
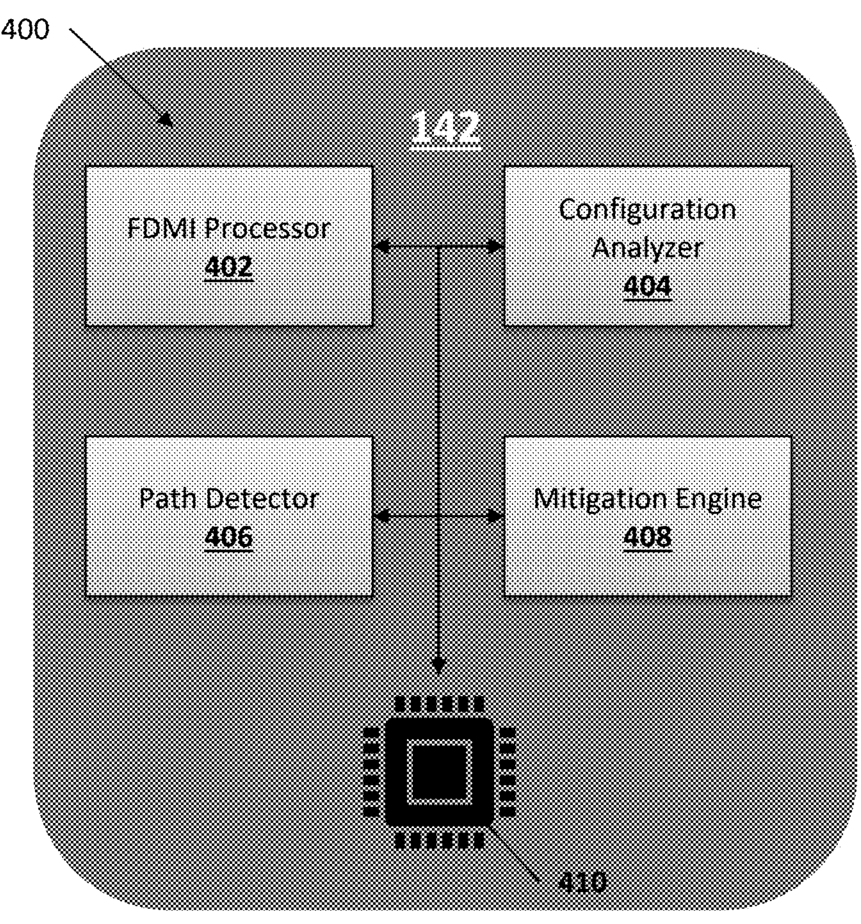
FIG. 4 is a block diagram of a controller in accordance with embodiments of the present disclosure.

The controller's analysis benefits environments where servers/hosts 126*a-n* share similar hardware configurations, allowing administrators to focus on workload-related performance variations rather than hardware/firmware inconsistencies. When servers/hosts 126*a-n* maintain hardware conformity under the controller's supervision, performance differences can be more readily attributed to application workloads or storage system capabilities rather than infrastructure variations Regarding FIG. 4, a storage array (e.g., the storage array 102 of FIG. 1) can include a controller 142, including hardware, logic, and circuitry 400, and a memory 410 that monitor and analyze storage system configurations.

In embodiments, the controller 142 can include an FDMI processor 402 that obtains and processes Fabric Device Management Interface (FDMI) information from switches (e.g., the switched 305*a-n* of FIG. 3) in a storage network (e.g., the SAM 118 of FIG. 3) through low-level Fiber Channel commands. The FDMI processor 402 can perform periodic queries to the switches, typically daily, since hardware and firmware configurations generally experience infrequent changes. When FDMI information is received, the FDMI processor 402 processes comprehensive configuration data, including HBA manufacturer information, model numbers, serial numbers, firmware version levels, operating system information, patch levels, HBA slot locations within servers, port configurations, World Wide Names (WWNs), and host names and identifiers. This configuration data is stored in the controller's memory 410 to enable subsequent analysis of hardware manufacturer consistency, firmware levels, port connectivity patterns, and communication paths between servers/hosts (e.g., the hosts 126*a-n* of FIG. 3) and a storage array (e.g., the storage array 102 of FIG. 3). By maintaining historical FDMI information, the FDMI processor 402 facilitates tracking of configurations over time and enables detection of changes that could potentially impact storage connectivity or performance. This systematic collection and storage of FDMI data is the foundation for the controller's capability to identify potential misalignments in hardware and firmware configurations throughout a storage environment.

In embodiments, the controller 142 can include a configuration analyzer 404 that analyzes FDMI information to evaluate connectivity patterns between servers/hosts and the storage array, performing several critical functions to ensure proper system configuration. The configuration analyzer 404 can process the FDMI data stored in the controller's memory 410 to identify manufacturer and firmware information for all connected HBAs, comparing these configurations against qualified hardware and firmware matrices published by storage array vendors. The configuration analyzer 404 can validate whether all HBAs within a single server are from the same manufacturer, as mixed-vendor configurations can lead to troubleshooting challenges where HBA manufacturers may attribute issues to other vendors' cards. When analyzing connectivity patterns, the configuration analyzer 404 examines masking information to understand which HBA World Wide Names (WWNs) are masked to the array. It correlates this with the FDMI information to determine which WWNs belong to which HBAs and servers. This enables the configuration analyzer 404 to identify irregular configurations, such as cases where some HBAs have different numbers of ports connected to the array compared to others within the same server. The configuration analyzer 404 maintains awareness of storage array vendor qualifications for various HBA manufacturers and firmware levels, allowing it to verify whether connected HBAs meet these qualification requirements. Through this comprehensive analysis, the configuration analyzer 404 helps ensure that server configurations maintain conformity and adhere to supported configurations, thereby reducing potential performance variability and simplifying storage management.

In embodiments, the controller 142 can include a path detector 406 that monitors and analyzes connectivity patterns to identify potential configuration issues and misalignments in the storage environment. The path detector 406 can examine communication paths between servers and storage arrays to detect single-path configurations that could represent potential points of failure. When analyzing connectivity patterns, the path detector 406 can evaluate port configurations across HBAs, comparing scenarios such as cases where a server has four HBAs but exhibits irregular port connectivity—for example, where three HBAs have dual-port connectivity while one HBA has only single-port connectivity. The path detector 406 performs detailed firmware level comparisons, examining consistency both between multiple HBAs within individual servers and across different servers connected to the storage array. Through analysis of the FDMI information, the path detector 406 can determine whether variations in firmware levels are present, recognizing that while such variations may be legitimate in some instances (such as when newer HBAs are installed that don't support older firmware versions), these situations warrant careful review. The path detector 406 maintains awareness of regular connectivity patterns, such as typical configurations where servers have equal numbers of ports connected from each HBA, allowing it to identify deviations from these standard patterns. When irregular patterns are detected, such as having three ports from one HBA and only two from another, the path detector 406 flags these configurations for review even though they may be technically valid configurations; this comprehensive pattern detection enables the controller 142 to identify potential configuration issues before they impact storage operations while still maintaining flexibility to accommodate legitimate configuration variations.

In embodiments, the controller 142 includes a mitigation engine 408 that handles the initiation and management of mitigation actions when hardware or firmware misalignments are detected in the storage environment. The mitigation engine 408 provides flexibility in managing notifications by allowing storage administrators to flag certain detected misalignments as legitimate to prevent repeated notifications about known acceptable variations. When processing notifications, the mitigation engine 408 implements a fine-grained filtering mechanism that enables administrators to customize notification frequency-such as suppressing notifications entirely, reporting once weekly, or reporting once monthly for specific paths, WWNs, or hosts. The mitigation engine 408 maintains awareness of previously reported issues. It can recognize when the same configuration has been flagged before, checking whether the user has designated it to be suppressed or monitored at a different reporting interval. For example, when a legitimate firmware variation exists due to hardware constraints, the mitigation engine 408 can be configured to reduce notification frequency to avoid overwhelming administrators with alerts about known conditions. The mitigation engine 408 interfaces with storage administrators to communicate detected issues, allowing them to work with server administrators to either correct identified misalignments or document them as acceptable exceptions. Through this comprehensive notification management approach, the mitigation engine helps administrators maintain visibility into potential configuration issues while avoiding alert fatigue from known variations.

The following text includes details of a method(s) or a flow diagram(s) per embodiments of this disclosure. For simplicity of explanation, each method is depicted and described as a set of alterable operations. Additionally, one or more operations can be performed in parallel, concurrently, or in a different sequence. Further, not all the illustrated operations are required to implement each method described by this disclosure.

Regarding FIG. 5, a method 500 relates to detecting hardware and firmware misalignments in storage environments. In embodiments, the controller 142 of FIG. 1 can perform all or a subset of operations corresponding to the method 500.

For example, the method 500, at 502, can include receiving, by a storage array, fabric device management interface (FDMI) information from a switch. The FDMI information can include hardware and firmware configuration data for a plurality of host bus adapters (HBAs) connected to a plurality of servers. Additionally, at 504, the method 500 can include analyzing, by the storage array, the FDMI information to determine connectivity patterns between the servers and the storage array, identify manufacturer and firmware information for the HBAs, and compare the identified information against qualified configurations. The method 500, at 506, can include detecting, based on the analysis, at least one hardware or firmware misalignment. Further, at 508, the method 500 can include initiating a mitigation action in response to detecting the at least one hardware or firmware misalignment, Further, each operation can include any combination of techniques implemented by the embodiments described herein. Additionally, one or more of the storage array's components 108 can implement one or more of the operations of each method described above.

Using the teachings disclosed herein, a skilled artisan can implement the above-described systems and methods in digital electronic circuitry, computer hardware, firmware, or software. The implementation can be a computer program product. Additionally, the implementation can include a machine-readable storage device for execution by or to control the operation of a data processing apparatus. The implementation can, for example, be a programmable processor, a computer, or multiple computers.

A computer program can be in any programming language, including compiled or interpreted languages. The computer program can have any deployed form, including a stand-alone program, subroutine, element, or other units suitable for a computing environment. One or more computers can execute a deployed computer program.

One or more programmable processors can perform the method steps by executing a computer program to perform the concepts described herein by operating on input data and generating output. An apparatus can also perform the steps of the method. The apparatus can be a special-purpose logic circuitry. For example, the circuitry is an FPGA (field-programmable gate array) or an ASIC (application-specific integrated circuit). Subroutines and software agents can refer to portions of the computer program, the processor, the special circuitry, software, or hardware that implements that functionality.

Processors suitable for executing a computer program include, by way of example, both general and special purpose microprocessors and any one or more processors of any digital computer. A processor can receive instructions and data from a read-only memory, a random-access memory, or both. Thus, for example, a computer's essential elements are a processor for executing instructions and one or more memory devices for storing instructions and data. Additionally, a computer can receive data from or transfer data to one or more mass storage device(s) for storing data (e.g., magnetic, magneto-optical disks, solid-state drives (SSDs, or optical disks).

Data transmission and instructions can also occur over a communications network. Information carriers that embody computer program instructions and data include all nonvolatile memory forms, including semiconductor memory devices. The information carriers can, for example, be EPROM, EEPROM, flash memory devices, magnetic disks, internal hard disks, removable disks, magneto-optical disks, CD-ROM, or DVD-ROM disks. In addition, the processor and the memory can be supplemented by or incorporated into special-purpose logic circuitry.

A computer with a display device enabling user interaction can implement the above-described techniques, such as a display, keyboard, mouse, or any other input/output peripheral. The display device can, for example, be a cathode ray tube (CRT) or a liquid crystal display (LCD) monitor. The user can provide input to the computer (e.g., interact with a user interface element). In addition, other kinds of devices can enable user interaction. Other devices can, for example, be feedback provided to the user in any form of sensory feedback (e.g., visual feedback, auditory feedback, or tactile feedback). For example, input from the user can be in any form, including acoustic, speech, or tactile input.

A distributed computing system with a back-end component can also implement the above-described techniques. The back-end component can, for example, be a data server, a middleware component, or an application server. Further, a distributing computing system with a front-end component can implement the above-described techniques. The front-end component can, for example, be a client computer with a graphical user interface, a web browser through which a user can interact with an example implementation, or other graphical user interfaces for a transmitting device. Finally, the system's components can interconnect using any form or medium of digital data communication (e.g., a communication network). Examples of communication network(s) include a local area network (LAN), a wide area network (WAN), the Internet, a wired network(s), or a wireless network(s).

The system can include a client(s) and server(s). The client and server (e.g., a remote server) can interact through a communication network. For example, a client-and-server relationship can arise when computer programs run on the respective computers and have a client-server relationship. Further, the system can include a storage array(s) that delivers distributed storage services to the client(s) or server (s).

Packet-based network(s) can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network(s), 802.16 network(s), general packet radio service (GPRS) network, HiperLAN), or other packet-based networks. Circuit-based network(s) can include, for example, a public switched telephone network (PSTN), a private branch exchange (PBX), a wireless network, or other circuit-based networks. Finally, wireless network(s) can include RAN, Bluetooth, code-division multiple access (CDMA) networks, time division multiple access (TDMA) networks, and global systems for mobile communications (GSM) networks.

The transmitting device can include, for example, a computer, a computer with a browser device, a telephone, an IP phone, a mobile device (e.g., cellular phone, personal digital assistant (PDA) device, laptop computer, electronic mail device), or other communication devices. The browser device includes, for example, a computer (e.g., desktop computer, laptop computer) with a World Wide Web browser (e.g., Microsoft® Internet Explorer® and Mozilla®). The mobile computing device includes, for example, a Blackberry®.

Comprise, include, or plural forms of each are open-ended, include the listed parts, and contain additional unlisted elements. Unless explicitly disclaimed, the term 'or' is open-ended and includes one or more of the listed parts, items, elements, and combinations thereof.

What is claimed is:

1. A method comprising:

receiving, by a storage array, fabric device management interface (FDMI) information from a switch, wherein the FDMI information includes hardware and firmware configuration data for a plurality of host bus adapters (HBAs) connected to a plurality of servers;

analyzing, by a controller of the storage array, the FDMI information to:

determine connectivity patterns between the servers and the storage array, and identify manufacturer and firmware information for the HBAs;

comparing, by the controller of the storage array, the identified manufacturer information and the identified firmware information against qualified configurations stored in the storage array;

detecting, based on the analysis and the comparison, at least one hardware or firmware misalignment; and initiating a mitigation action in response to detecting the at least one hardware or firmware misalignment.

2. The method of claim 1, further comprising:

determining whether any server has only a single communication path to the storage array.

3. The method of claim 1, further comprising:

determining whether HBA port connectivity patterns are consistent across the plurality of servers by comparing numbers of connected ports per HBA.

4. The method of claim 1, further comprising:

determining whether all HBAs within a single server are from the same manufacturer.

5. The method of claim 1, further comprising:

comparing firmware levels between multiple HBAs within a single server.

6. The method of claim 1, further comprising:

comparing firmware levels of similar HBAs across different servers connected to the storage array.

7. The method of claim 1, further comprising:

verifying whether identified HBA manufacturers are qualified for use with the storage array based on an approved hardware/firmware matrix.

8. The method of claim 1, further comprising:

receiving an indication to flag a detected misalignment as legitimate.

9. The method of claim 8, further comprising:

suppressing future notifications for the flagged misalignment.

10. The method of claim 1, further comprising:

periodically querying the switch to obtain updated FDMI information.

11. An apparatus with a memory and processor, the apparatus configured to:

receive fabric device management interface (FDMI) information from a switch, wherein the FDMI information includes hardware and firmware configuration data for a plurality of host bus adapters (HBAs) connected to a plurality of servers;

analyze the FDMI information to:

determine connectivity patterns between the servers and a storage array, and identify manufacturer and firmware information for the HBAs;

compare the identified manufacturer information and the identified firmware information against qualified configurations stored in the storage array;

detect, based on the analysis and the comparison, at least one hardware or firmware misalignment; and initiate a mitigation action in response to detecting the at least one hardware or firmware misalignment.

12. The apparatus of claim 11, further configured to:

determine whether any server has only a single communication path to the storage array.

13. The apparatus of claim 11, further configured to:

determine whether HBA port connectivity patterns are consistent across the plurality of servers by comparing numbers of connected ports per HBA.

14. The apparatus of claim 11, further configured to:

determine whether all HBAs within a single server are from the same manufacturer.

15. The apparatus of claim 11, further configured to:

compare firmware levels between multiple HBAs within a single server.

16. The apparatus of claim 11, further configured to:

compare firmware levels of similar HBAs across different servers connected to the storage array.

17. The apparatus of claim 11, further configured to:

verify whether identified HBA manufacturers are qualified for use with the storage array based on an approved hardware/firmware matrix.

18. The apparatus of claim 11, further configured to:

receive an indication to flag a detected misalignment as legitimate.

19. The apparatus of claim 18, further configured to:

suppress future notifications for the flagged misalignment.

20. The apparatus of claim 11, further configured to:

periodically query the switch to obtain updated FDMI information.

* * * * *